US012319365B2

(12) United States Patent
Preijert et al.

(10) Patent No.: US 12,319,365 B2
(45) Date of Patent: Jun. 3, 2025

(54) VEHICLE STEERING SYSTEM AND METHOD FOR CONTROLLING A STEERING ANGLE OF A VEHICLE WHEEL

(71) Applicant: Volvo Truck Corporation, Gothenburg (SE)

(72) Inventors: Stefan Preijert, Gothenburg (SE); Anders Olsson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/557,127

(22) Filed: Dec. 21, 2021

(65) Prior Publication Data

US 2022/0219752 A1 Jul. 14, 2022

(30) Foreign Application Priority Data

Jan. 13, 2021 (EP) .................................... 21151260

(51) Int. Cl.
*B62D 5/00* (2006.01)
*B62D 5/04* (2006.01)
(Continued)

(52) U.S. Cl.
CPC .............. *B62D 5/046* (2013.01); *B62D 7/08* (2013.01); *B62D 7/20* (2013.01)

(58) Field of Classification Search
CPC . B62D 5/00; B62D 5/04; B62D 5/046; B62D 6/002; B62D 7/06; B62D 7/08; B62D 7/09; B62D 7/20; B62D 17/00
See application file for complete search history.

(56) References Cited

U.S. PATENT DOCUMENTS 10,780,918 B2 *  9/2020  Buchanan ................ B62D 9/00
11,603,133 B2 *  3/2023  Itoh ....................... B62D 5/0409
(Continued)

FOREIGN PATENT DOCUMENTS

CN       114104091 A  *  3/2022  ........... B62D 5/0487
CN       110678347 B  *  1/2023  ............... B60K 1/00
(Continued)

OTHER PUBLICATIONS

Description Translation for EP 2,759,458 from Espacenet (Year: 2014).*

(Continued)

*Primary Examiner* — Jason D Shanske
*Assistant Examiner* — Daniel M. Keck
(74) *Attorney, Agent, or Firm* — Withrow & Terranova, PLLC

(57) ABSTRACT

The invention relates to a vehicle steering system comprising a steering wheel, a first and a second steering assembly. The steering assemblies each comprise a steering linkage mechanically connected to a road wheel and a support motor. The steering wheel is configured to control a steering angle of a first road wheel via a first support motor actuating a first steering linkage. A processing circuitry is configured to receive, from the first steering assembly, input signals comprising one or more steering parameter values measured for the first steering assembly. Based on the received first input signals, the processing circuitry is configured to calculate a desired steering angle of a second road wheel and to send control signals to a second support motor so as to actuate a second steering linkage such that the desired steering angle of the second road wheel is obtained. A method is also disclosed.

10 Claims, 6 Drawing Sheets

(51) Int. Cl.
    *B62D 6/00*                      (2006.01)
    *B62D 7/08*                      (2006.01)
    *B62D 7/09*                      (2006.01)
    *B62D 7/15*                      (2006.01)
    *B62D 7/20*                      (2006.01)

(56) References Cited

U.S. PATENT DOCUMENTS

| | | | |
|---|---|---|---|
| 11,970,231 B2 * | 4/2024 | Zwegers | B62D 7/1545 |
| 2003/0019670 A1 * | 1/2003 | Matz | B62D 5/001 |
| | | | 180/6.44 |
| 2004/0026158 A1 | 2/2004 | Rieth et al. | |
| 2005/0072621 A1 * | 4/2005 | Hara | B62D 1/163 |
| | | | 180/444 |
| 2005/0257992 A1 * | 11/2005 | Shiino | B62D 5/04 |
| | | | 180/444 |
| 2008/0167778 A1 | 7/2008 | Tsukasaki et al. | |
| 2008/0184838 A1 * | 8/2008 | Hayashi | B62D 6/002 |
| | | | 74/484 R |
| 2010/0170728 A1 * | 7/2010 | Sorg | B62D 11/005 |
| | | | 180/6.7 |
| 2017/0096062 A1 * | 4/2017 | Wu | B60K 17/356 |
| 2017/0267275 A1 | 9/2017 | Engels et al. | |
| 2022/0055690 A1 * | 2/2022 | Itoh | B62D 5/0418 |

| | | | |
|---|---|---|---|
| 2022/0289290 A1 * | 9/2022 | Andringa | B62D 7/16 |
| 2022/0297745 A1 * | 9/2022 | Ohno | B62D 5/0469 |
| 2023/0052313 A1 * | 2/2023 | Cai | B62D 5/0448 |
| 2023/0106423 A1 * | 4/2023 | Wang | B62D 7/226 |
| | | | 180/445 |
| 2023/0202551 A1 * | 6/2023 | Wang | B62D 5/003 |
| | | | 180/411 |
| 2023/0303170 A1 * | 9/2023 | Oowada | B62D 17/00 |
| | | | 280/86.75 |

FOREIGN PATENT DOCUMENTS

| | | | | |
|---|---|---|---|---|
| EP | 2604489 A2 * | 6/2013 | | B62D 5/001 |
| EP | 2759458 B1 | 4/2015 | | |
| JP | 2015093652 A * | 5/2015 | | B60G 3/14 |
| WO | 14203574 A1 | 12/2014 | | |
| WO | 2020111997 A1 | 6/2020 | | |
| WO | WO-2024227212 A2 * | 11/2024 | | B60G 9/02 |

OTHER PUBLICATIONS

European Search Report for European Patent Application No. 21151260.3, mailed Jun. 30, 2021, 10 pages.

Intention to Grant for European Patent Application No. 21151260.3, mailed Feb. 13, 2024, 42 pages.

\* cited by examiner

VEHICLE STEERING SYSTEM AND METHOD FOR CONTROLLING A STEERING ANGLE OF A VEHICLE WHEEL

RELATED APPLICATIONS

The present application claims priority to European Patent Application No. 21151260.3, filed on Jan. 13, 2021, and entitled "VEHICLE STEERING SYSTEM AND METHOD FOR CONTROLLING A STEERING ANGLE OF A VEHICLE WHEEL," which is incorporated herein by reference in its entirety.

TECHNICAL FIELD

The present disclosure relates to a vehicle steering system. The present disclosure also relates to a method for controlling a steering angle of a vehicle wheel. Furthermore, the present disclosure relates to a computer program, to a computer readable medium and to a processing circuitry for controlling a steering angle of a vehicle wheel.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

It is known to have electrically supported vehicle steering systems which complement the mechanical steering systems. Such electrically supported vehicle steering systems may be provided, for instance, to reduce vibration input to the steering wheel of a vehicle. Another functionality may be to provide forced feedback for guiding the driver. A further functionality may be to provide parking assistance.

Since the wheels on the left and right hand sides are rigidly connected the steering angles are a compromise for handling a plurality of different steering scenarios. Furthermore, any error in setting is present until it is taken care of in a workshop, thus resulting in tire wear and increased fuel consumption.

It would be desirable to provide a vehicle steering system for which the wheel alignment is improved, regardless of the particular driving conditions and steering scenarios.

SUMMARY

An object of the invention is to provide a vehicle steering system and a method for controlling a steering angle of a vehicle wheel, which at least partly alleviate the drawbacks of the prior art. This object is accomplished by a vehicle steering system and a method as disclosed in the accompanying independent claims.

The present inventive concept is based on the realization that by providing an electrical/data dependency between the left and the right wheel, specifically an electrical/data dependency between a left steering assembly and a right steering assembly, instead of a mechanical dependency, the relative steering angle of the two wheels may be adjusted in different driving scenarios. In particular, the inventors have realized that by analysing a status of one of the steering assemblies associated with one of the wheels, it is possible to effectively adjust the steering angle of the other wheel.

According to a first aspect of the present disclosure, there is provided a vehicle steering system, comprising:
a steering wheel,
a first steering assembly, comprising
a first steering linkage mechanically connected to a first road wheel at a first end of a wheel axle,
a first support motor operatively connected to the steering wheel and the first steering linkage,
wherein the steering wheel is configured to control a steering angle of the first road wheel via the first support motor actuating the first steering linkage,
a second steering assembly, comprising
a second steering linkage mechanically connected to a second road wheel at a second end of said wheel axle,
a second support motor operatively connected to the second steering linkage,
a processing circuitry configured to receive from the first steering assembly first input signals, the first input signals comprising one or more steering parameter values measured for the first steering assembly,
wherein, based on the received first input signals, the processing circuitry is configured to calculate a desired steering angle of the second road wheel and to send control signals to the second support motor so as to actuate the second steering linkage such that said desired steering angle of the second road wheel is obtained.

By the provision of a vehicle steering system which comprises a processing circuitry that receives information about parameter values measured for the first steering assembly linked to the first road wheel, it can calculate an appropriate steering angle for the second road wheel. For instance, if the processing circuitry notes that the current vehicle operating condition is straight forward driving, it may control the second road wheel to have substantially the opposite steering angle as the first road wheel (for example, if the input signals to the processing circuitry are indicative of the left road wheel being at a steering angle of +0.1 (of any suitable unit), then it may send control signals that result in −0.1 for the right road wheel). This reduces rolling resistance. In other vehicle operating conditions, other control signals may be sent. For instance, if the processing circuitry notes that the vehicle is driving through a curve, appropriate lateral force control is desirable, and the processing circuitry may send appropriate control signals, which may suitably vary over time. For example, if the left road wheel is kept at a steering angle of 1 for a period of time, such as a plurality of seconds, then the right road wheel may be controlled to gradually increase the steering angle, say from 0.2 to 0.8 for good lateral force control. Thus, unlike the prior art mechanical solutions, including Ackermann steering linkage and the like, the present vehicle steering system does not need to compromise to cover different vehicle operating conditions. Thus, it should be understood that said first input signals may suitably contain data representative of the steering angle of the first road wheel.

It should be understood that although the vehicle steering system comprises a steering wheel, it is not limited to implementation in driver-operated vehicles. The present vehicle steering system may also be used in autonomous vehicles.

It should also be understood that the processing circuitry may send its control signals based on current vehicle operating conditions. However, it may also base its control signals on a desired vehicle operating condition. Thus, in a general sense, according to at least one exemplary embodiment, the processing circuitry is configured to also base its calculations of said desired steering angle on a current or a desired vehicle operating condition. By taking into account a current or desired vehicle operating condition, an even more accurate control may be made. For instance, the processing circuitry may make different calculations in different scenarios depending on if the vehicle is driving fast or slowly, or if the road surface is smooth or uneven, etc. Furthermore, it may in some exemplary embodiments base its control signals on a predicted vehicle operating condition.

According to at least one exemplary embodiment, the processing circuitry comprises or has communicative access to an electronic memory in which a set of rules are stored, wherein each rule is associated with one or more predefine vehicle operating conditions, wherein, for a certain current or desired vehicle operating condition, the processing circuitry is configured to also base its calculations of said desired steering angle on a rule associated with said certain current or desired vehicle operating condition. This is advantageous as the steering angle may be adapted not only based on input signals which relate to the steering angle of the first road wheel, but also to other general vehicle operating conditions. As mentioned above, the speed of the vehicle may be such a condition which may suitably be taken into account when calculating the desired steering angle for the second road wheel. Thus, from the above it should be understood that the processing circuitry may suitably have an interface for receiving sensor data signals from external sensors or via a vehicle control unit, etc.

According to at least one exemplary embodiment, the processing circuitry is configured to receive from the second steering assembly second input signals, the second input signals comprising one or more current steering parameter values measured for the second steering assembly, wherein, the processing circuitry is configured to control the second support motor, by means of said control signals, also based on the received second input signals. By having information of the current status for the second steering assembly and/or second road wheel, the processing circuitry may calculate how much additional or how much less torque the second support motor should apply to the steering linkage. For instance, an uneven road surface may affect the forces acting on the road wheel and the thus the steering linkage differently than when travelling on a smooth road surface. Accordingly, different amounts of compensation may be desirable depending on the current steering parameter values measured for the second steering assembly.

In today's steering systems there is normally provided a track rod between the steering knuckles at the wheel for steering redundancy. However, the inventors of the present invention have realized that by substituting a track rod with a more flexible solution, steering redundancy may be maintained while the flexibility in adjusting the second steering angle relative to the first steering angle, as already explained in this disclosure, is also achieved. This is at least partly reflected in some of the following exemplary embodiments.

According to at least one exemplary embodiment, the vehicle steering system comprises a connecting member assembly, wherein the connecting member assembly comprises
  a central joint,
  a first connecting member extending from the first steering assembly to one side of the central joint, and
  a second connecting member extending from the second steering assembly to another side of the central joint,
    wherein the first and the second connecting members are movable relative to each other in the central joint.

The connecting member assembly provides the advantage of the traditional track rod, while allowing for the inventive angle adjustment of the second steering angle of the second road wheel. The first and the second connecting members may suitably be connected to the central joint at opposite sides of the central joint. For instance, the first road wheel and the first steering assembly may be provided on a left side of the vehicle, wherein the first connecting member extends to a left side of the central joint, while the second road wheel and the second steering assembly may be provided on a right side of the vehicle and thus the second connecting member may extend to the right side of the central joint.

The connecting member assembly may be provided at different locations, which may affect the configuration of the connecting member assembly. Considering the fact that in a steering system, and in particular the steering assembly, there may be various links and connections between components performing different movements, such as pivoting, rotational, translational movements. Depending on which type of components of the steering assembly that you want to connect the connecting member assembly, the relative motion between the first and the second connecting member is suitably adapted to the type of movement performed by those components.

For instance, the connecting member assembly may be connected to components which are movable closer to or further away from the central longitudinal axis of the vehicle (i.e. the roll axis), such as by a pivoting motion. The pivoting may suitably be around an axis parallel to the yaw axis of the vehicle. The first and the second connecting members are thus suitably movable relative to each other in a direction perpendicular to the roll axis. Thus, according to at least one exemplary embodiment, the first and the second connecting members are movable relative to each other in a direction parallel to the pitch axis of the vehicle. The central joint may thus be a translation joint. This is reflected in the following exemplary embodiment.

According to at least one exemplary embodiment, the central joint is a translation joint for enabling relative translational movement between the first connecting member and the second connecting member when the relative angle between the first steering angle and the second steering angle changes. Thus, the total length of the connecting member assembly is variable. Suitably, the first connecting member may be connected to a left side knuckle, and the second connecting member may be connected to the right side knuckle. As the relative steering angle between the wheels change, i.e. as the angle between the left side knuckle and right side knuckle change, the first and second connecting members will move towards or away from each other within the translation joint.

Such a translation joint may suitably include a safety translation stop. A safety translation stop may be provided for creating a mechanical safety connection between the first steering assembly and the second steering assembly (such as between the exemplified left and right side knuckles) if electric and/or hydraulic support fails (e.g. failure of second support motor).

In some exemplary embodiments, the connecting member assembly may be connected to components which are movable forwards or rearwards in the longitudinal direction of the vehicle (such as by a pivoting motion in a vertical plane which is parallel to the roll axis). In such case the first and the second connecting members are suitably movable relative to each other in a rotational direction, such as in a rotational motion around an axis parallel to the pitch axis. Thus, the central joint may be a rotation joint. This is reflected in the following exemplary embodiment, According to at least one exemplary embodiment, the central joint is a rotation joint for enabling relative rotational movement between the first connecting member and the second connecting member when the relative angle between the first steering angle and the second steering angle changes. Suitably the first connecting member may be connected to a left side pitman arm, and the second connecting member may be connected to a right side pitman arm. Pivoting of the pitman arms causes rotation of the respective connecting member. As the relative steering angle between the wheels change, i.e. the relative pivoting position of the pitman arms change, the first and second connecting members will rotate relative to each other within the rotation joint.

Such a rotation joint may suitably include a safety rotational stop. A safety rotational stop may be provided for creating a mechanical safety connection between the first and second steering assembly, if electric and/or hydraulic support fails (e.g. failure of second support motor).

Furthermore, there may be provided a gear box as an additional security feature. If the second support motor fails, the connecting member assembly still functions as a mechanical link between the first steering assembly and the second steering assembly, via the gear box. The rotational direction of the connecting member assembly is changed by the gear box to an opposite rotational direction for the connected component of the second steering assembly, which will be required for turning the second road wheel in the same direction as the first road wheel. This will be explained more clearly in connection with the discussion of the drawings. It should, however, be noted that in normal functional operation, the gear box is not in operative action, and the control of the second steering assembly may be done electrically and/or hydraulically, by means of the second support motor.

According to at least one exemplary embodiment, said one or more steering parameter values measured for the first steering assembly is one of, or a combination of:
a steering gear angle of a gear of the first support motor directly or indirectly engaged with the first steering linkage,
a steering torque provided by the first support motor to the first steering linkage,
a force measured in the first steering linkage.

By measuring the steering gear angle an indirect measurement of the present steering angle of the first road wheel is obtainable. In other exemplary embodiments, there may be provided an angle sensor at the first road wheel, such as at a wheel knuckle to which the first road wheel is mounted. The steering torque and the force parameters may be useful for different scenarios, such as for counteracting undesired lateral forces and to balance left and right side torques.

Similarly, the corresponding indirect measurement may also be made for the second road wheel. Thus, according to at least one exemplary embodiment, said one or more steering parameter values measured for the second steering assembly is one of, or a combination of:
a steering gear angle of a gear of the second support motor directly or indirectly engaged with the second steering linkage,
a steering torque provided by the second support motor to the second steering linkage,
a force measured in the second steering linkage.

According to at least one exemplary embodiment, said first support motor is an electric or hydraulic support motor, and wherein said second support motor is an electric or hydraulic support motor. Electric power steering and hydraulic power steering systems each have their advantages. Electric support motors are relatively easy to calibrate and are often more lightweight then hydraulic motors with its accessories. On the other hand, some drivers are of the opinion that hydraulic power steering provides a better feel for the road.

According to at least one exemplary embodiment, the processing circuitry is configured to calculate said desired steering angle so as to allow adaptation for any one of:
shunting,
cornering,
bump and brake steer compensation,
toe in or toe out compensation,
Ackerman angle control.

By detecting a shunting manoeuvre, and control the steering angle of the second road wheel according to the general inventive concept, internal forces, steering effort and tire wear may be reduced. In a cornering manoeuvre, the Ackerman control may be improved compared to prior art systems in which the Ackerman control is a compromise with the road wheels ability to handle other situations. Any error in toe in or toe out can be handled by the system, without needing to adjust manually in a workshop.

According to a second aspect of the present disclosure, there is provided a vehicle which comprises a vehicle steering system according to the first aspect, including any embodiment thereof. The advantages of the vehicle of the second aspect largely correspond to the advantages of the vehicle steering system of the first aspect, including any embodiment thereof.

According to a third aspect of the present disclosure, there is provided a method for controlling a steering angle of a vehicle wheel, the method being implemented in a vehicle steering system which comprises:
a first steering assembly, comprising
a first steering linkage mechanically connected to a first road wheel at a first end of a wheel axle,
a first support motor operatively connected to the steering wheel and the first steering linkage,
wherein the steering wheel is configured to control a steering angle of the first road wheel via the first support motor actuating the first steering linkage,
a second steering assembly, comprising
a second steering linkage mechanically connected to a second road wheel at a second end of said wheel axle,
a second support motor operatively connected to the second steering linkage,
the method comprising:
receiving from the first steering assembly first input signals, the first input signals comprising one or more steering parameter values measured for the first steering assembly,
calculating, based on the received first input signals, a desired steering angle of the second road wheel, and
sending control signals to the second support motor so as to actuate the second steering linkage such that said desired steering angle of the second road wheel is obtained.

The advantages of the method according to the third aspect, including any embodiment thereof, largely correspond to those of the vehicle steering system of the first aspect, including any embodiment thereof.

According to at least one exemplary embodiment, the method is carried out for a vehicle steering system according to the first aspect, including any embodiment thereof, or a vehicle according to the second aspect, including any embodiment thereof.

According to a fourth aspect of the present disclosure, there is provided a computer program comprising program code means for performing the method according to the third aspect, including any embodiments thereof, when said program is run on a computer. The advantages of the computer program of the fourth aspect largely correspond to those of the other aspects, including any embodiments thereof.

According to a fifth aspect of the present disclosure, there is provided a computer readable medium carrying a computer program comprising program code means for performing the method according to the third aspect, including any embodiments thereof, when said program product is run on a computer. The advantages of the computer readable medium of the fifth aspect largely correspond to the advantages of the other aspects, including any embodiments thereof.

According to a sixth aspect of the present disclosure, there is provided a processing circuitry for controlling a steering angle of a vehicle wheel, the processing circuitry being configured to perform the method according the third aspect, including any embodiments thereof. The advantages of the processing circuitry of the sixth aspect largely correspond to the advantages of the other aspects, including any embodiments thereof.

The processing circuitry of the sixth aspect and the processing circuitry used in the vehicle steering system of the first aspect may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
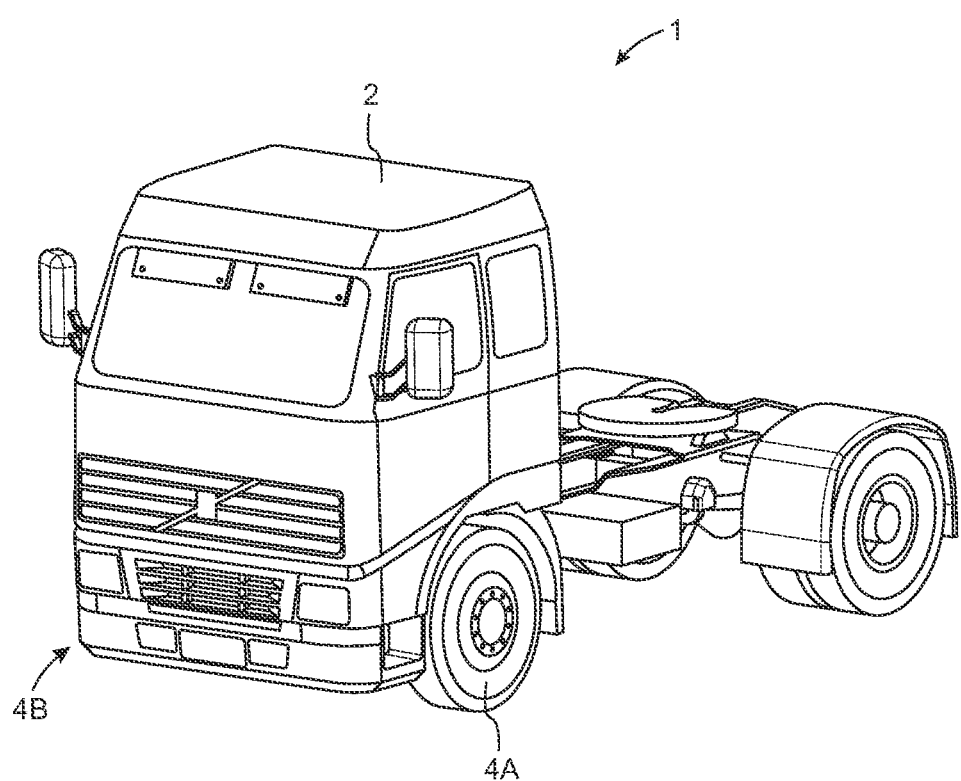
FIG. 1 illustrates a vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle 1 may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars. The vehicle 1 has a cabin 2 in which a driver me operate the vehicle. However, in at least some exemplary embodiments, the vehicle 1 may be autonomous.

The illustrated vehicle 1 is supported on road wheels 4A, 4B. Although the vehicle in FIG. 1 only has two axles carrying road wheels 4A, 4B, the inventive concept is applicable to vehicles having more axles carrying road wheels, such as in the above-mentioned different types of vehicles.

The road wheels 4A, 4B on the front axle 5 are steered wheels. In other exemplary embodiments, other axles may also be provided with steered wheels. The vehicle 1 is provided with power assisted steering, such that when a steering wheel in the cabin 2 is turned, support motors provide additional force to turn the front road wheels 4A, 4B. The vehicle 1 may suitably comprise a vehicle steering system in accordance with the general inventive concept. Two exemplary illustrations of such a vehicle steering system are presented in FIGS. 2 and 3.

Figure 2:
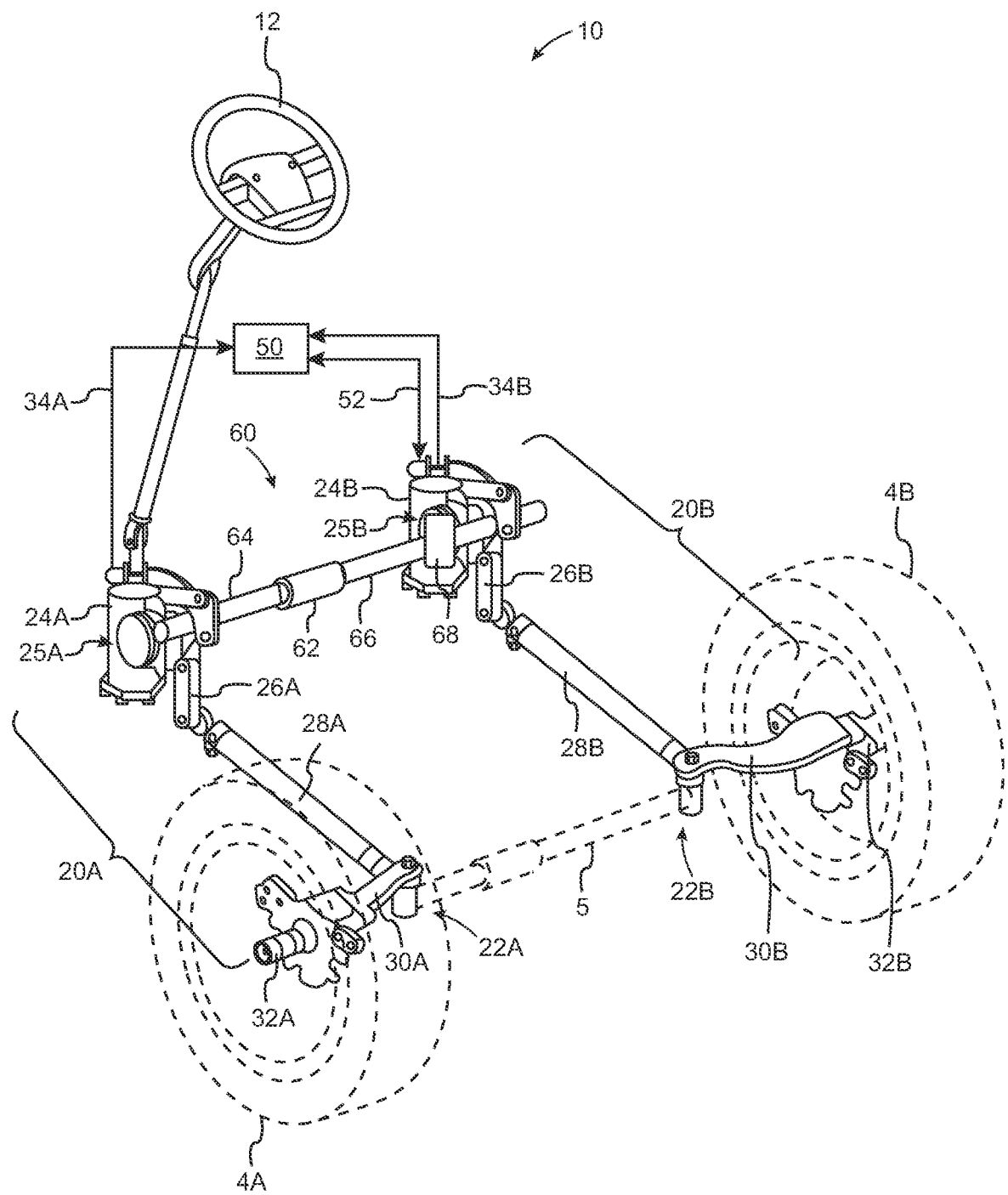
FIG. 2 illustrates a vehicle steering system according to at least one exemplary embodiment of the invention.

FIG. 2 illustrates a vehicle steering system 10 according to at least one exemplary embodiment of the invention. The vehicle steering system 10 comprises a steering wheel 12. A driver may turn the steering wheel 12 in order to turn the vehicle. However, as mentioned above, the general inventive concept is also applicable to autonomous vehicles. The vehicle steering system 10 also comprises a first steering assembly.

The steering wheel is, via a shaft, connected to the first steering assembly 20A, which in its turn is connected to a first road wheel 4A at a first end of a wheel axle 5. The first road wheel 4A is illustrated and it should be understood that the actual mounting of the first road wheel 4A may suitably correspond to the mounting of the second road wheel 4B. The first road wheel 4A should in the example be understood to represent a left road wheel, however in other exemplary embodiments it could be a road wheel on the right hand side.

The first steering assembly 20A comprises a first steering linkage 22A which is mechanically connected to the first road wheel 4A. The first steering assembly 20A also comprises a first support motor 24A which is operatively connected to the steering wheel 12. The rotation and torque of the steering wheel 12 gives input to the first support motor 24A, in particular to a steering gear 25A of, or associated to, the first support motor 24A for electrical and/or hydraulic support. The first support motor 24A is also operatively connected to the first steering linkage 22A. The first steering linkage 22A comprises a first Pitman arm 26A, a first link rod 28A and a first steering arm 30A. The steering gear 25A of the first support motor 24A rotates the first Pitman arm 26A which in turn pushes or pulls the first link rod 28A to the first steering arm 30A (push or pull depends on which direction the steering wheel 12 is turned). Rotation of the first steering arm 30A and the torque provided by the first steering arm 30A causes a first wheel knuckle 32A to turn. The first road wheel 4A turns with the first wheel knuckle 32A.

From the above is should be understood that the steering wheel 12 is configured to control a steering angle of the first road wheel 4A via the first support motor 24A actuating the first steering linkage 22A.

The vehicle steering system 10 also comprises a second steering assembly 20B. The second steering assembly 20B comprises a second steering linkage 22B which is mechanically connected to the second road wheel 4B, and a second support motor 24B which is operatively connected to the second steering linkage 22B. The second steering linkage 22B comprises, similarly to the first steering linkage, a second Pitman arm 26B, a second link rod 28B and a second steering arm 30B.

The vehicle steering system 10 further comprises a processing circuitry 50 which is configured to receive from the first steering assembly 20A first input signals 34A. The first input signals 34A comprises one or more steering parameter values measured for the first steering assembly 20A. The first input signals 34A may be the torque provided by the first support motor 24A or the steering gear 25A of the first support motor 24A and/or a steering gear angle. Other conceivable input signals may be strain measurement signals on the push and pull force at the first link rod 28A. Another possibility is to have wheel knuckle angle sensors at the wheel rotation axis.

Based on the received first input signals 34A, the processing circuitry 50 is configured to calculate a desired steering angle of the second road wheel 4B and to send control signals 52 to the second support motor 24B so as to actuate the second steering linkage 22B such that said desired steering angle of the second road wheel 4B is obtained. Thus, the second support motor 24B will provide an electrical and/or hydraulic steering torque such that the steering gear 25B of the second support motor 24B rotates the second Pitman arm 26B, the rotation of which causes the second link rod 28B to be pushed/pulled, which in turn causes the second steering arm 30B to rotate, and thus the second wheel knuckle 32B and the second road wheel 4B to turn.

It should be noted that the first steering assembly 20A and the second steering assembly 20B are assembled in such way that, in order for both the first and second road wheel 4A, 4B to turn in the same direction (for example turn right), the first link rod 28A and the second link rod 28B will be moved in opposite directions. Thus, the first Pitman arm 26A will be engaged by the steering gear 25A of the first support motor 24A to push the first link rod 28A, while the second Pitman arm 26B will be engaged to pull the second link rod 28B.

All of the above mentioned first components have been illustrated as left side components, and all of the second components have been illustrated as right side components. It should, however, be understood that in other exemplary embodiments the first components may be on the right side of the vehicle and the second components may be on the left side of the vehicle.

The processing circuitry 50 may, suitably, be configured to also base its calculations of said desired steering angle on a current or a desired vehicle operating condition. Accordingly, the processing circuitry 50 may control the first road wheel 4A (via the second support motor 24A and second steering linkage 22A) such that in one vehicle operating condition the relative difference in steering angle between the first and the second road wheel 4A, 4B is different (larger or smaller) than the relative difference in steering angle in another vehicle operating condition. For instance, taking the same curve in different velocities may suitably result in different steering angles for the second road wheel 4B, although the steering angle may be the same for the first road wheel 4A. Another example, is straight driving versus driving through a curve. In straight driving the first and second road wheel 4A, 4B may have practically the same steering angle (0 degrees), unless of course the processing circuitry 50 compensates for toe in/toe out. Through a curve, the processing circuitry 50 calculates a suitably steering angle of the second road wheel 4B, which oftentimes will be different from the current steering angle of the first road wheel 4A.

The processing circuitry 50 may be provided using any combination of one or more of a suitable central processing unit CPU, multiprocessor, microcontroller, digital signal processor DSP, etc., capable of executing software instructions stored in a computer program product, e.g. in the form of a storage medium. The processing circuitry 50 may further be provided as at least one application specific integrated circuit ASIC, or field programmable gate array FPGA. Particularly, the processing circuitry configured to perform a set of operations, or steps, such as the inventive method discussed in this disclosure. For example, the storage medium may store the set of operations, and the processing circuitry may be configured to retrieve the set of operations from the storage medium to perform the set of operations. The set of operations may be provided as a set of executable instructions. Thus, the processing circuitry 50 is thereby arranged to execute exemplary methods as herein disclosed. The storage medium may also comprise persistent storage, which, for example may be any single one or combination of magnetic memory, optical memory, solid state memory or even remotely mounted memory. The processing circuitry 50 may further comprise an interface for communications with at least one external device such as the support motors, sensors, etc. As such, the interface may comprise one or more transmitters and receivers, comprising analogue and digital components and a suitable number of ports for wireline or wireless communication. The processing circuitry 50 may thus send data and control signals to the interface and the storage medium, and may receiving data and reports from the interface, and may retrieve data and instructions form the storage medium.

The processing circuitry 50 may, suitably, comprise or have communicative access to an electronic memory (such as in the above-mentioned storage medium) in which a set of rules are stored, wherein each rule is associated with one or more predefine vehicle operating conditions. For a certain current or desired vehicle operating condition, the processing circuitry 50 is configured to also base its calculations of said desired steering angle on a rule associated with said certain current or desired vehicle operating condition. The set of rules may suitably be provided in the form of a look up table and/or as algorithms.

Below is a simple example of a table to illustrate algorithms for guiding the steering angles. It should be understood that the table is merely provided for illustrative purposes, and that many different variants of the table are conceivable and appropriately adaptable to the vehicle in question.

Table to illustrate the algorithms for guiding the steering angles

| | | Left side gear A1 | | Right side gear B1 | |
|---|---|---|---|---|---|
| | Time | A1t | A1a | B1t | B1a |
| Minimizing rolling resistance | 0 | 1.00 | 0.80 | −1.00 | −0.80 |
| (straight forward driving) | 1 | 0.80 | 0.65 | −0.80 | −0.65 |
| Example A | 2 | 0.40 | 0.30 | −0.40 | −0.30 |
| | 3 | 0.10 | 0.15 | −0.10 | −0.15 |
| | 4 | 0.02 | 0.10 | −0.02 | −0.10 |
| | 5 | 0.00 | 0.10 | 0.00 | −0.10 |
| Lateral force control | 0 | 0.7 | 1 | 0.3 | 0.2 |
| (curve driving) | 1 | 0.675 | 1 | 0.325 | 0.25 |
| Example B | 2 | 0.575 | 1 | 0.375 | 0.5 |
| | 3 | 0.525 | 1 | 0.475 | 0.75 |
| | 4 | 0.5 | 1 | 0.5 | 0.8 |
| | 5 | 0.5 | 1 | 0.5 | 0.8 |
| Maximizing turnability | 0 | 0.1 | 0 | 0 | 0 |
| (maximizing wheel cut angle) | 1 | 0.2 | 0.1 | 0.1 | 0.1 |
| Example C | 2 | 0.5 | 0.5 | −0.05 | 0.5 |
| | 3 | 0.7 | 0.9 | −0.07 | 0.9 |
| | 4 | 0.8 | 1 | −0.07 | 1 |
| | 5 | 0.8 | 1 | −0.07 | 1 |
| Minimizing rolling resistance | 0 | 0 | 0 | 0 | 0 |
| (small steering manoeuvres at | 1 | 0.35 | 0.5 | 0.45 | 0.7 |
| at high driving speed) | 2 | 0.55 | 0.8 | 0.65 | 1 |
| Example D | 3 | 0.35 | 0.5 | 0.45 | 0.7 |
| | 4 | −0.45 | −0.7 | −0.35 | −0.5 |
| | 5 | −0.65 | −1 | −0.55 | −0.8 |
| | 6 | −0.45 | −0.7 | −0.35 | −0.5 |
| | 7 | 0 | 0 | 0 | 0 |

A1t is the torque applied at the first (left) steering gear 25A of the first support motor 24A, activated by the driver/steering wheel 12.

A1a is the left steering gear angle, activated by the driver/steering wheel 12.

B1t is the torque applied at the second (right) steering gear 25B of the second support motor 24B, activated by the processing circuitry 50.

B1a is right steering gear angle, activated by the processing circuitry 50.

The above four exemplary driving scenarios are illustrated, by way of example, in FIGS. 4-7. More specifically, FIGS. 4-7 illustrate graphs of different driving scenarios, showing the relations between torque and angle of the steering gear 25A of the first support motor and the steering gear 25B of the second support motor. It should be noted that a purpose of the vehicle steering system is to control the first and second steering angles, i.e. to control the angles of the wheel knuckles (32A and 32B in FIG. 2), and thus the road wheels 4A, 4B. These angles of the wheel knuckles have a direct relation to the steering gear angles A1a and B1a via the steering linkages (22A and 22B in FIG. 2). Therefore, by controlling A1a (by means of the steering wheel) a desired first steering angle of the first road wheel 4A is obtained, and by controlling B1a (by means of the processing circuitry based on input signals from the first steering assembly) said desired second steering angle of the second road wheel 4B is obtained.

Figure 4:
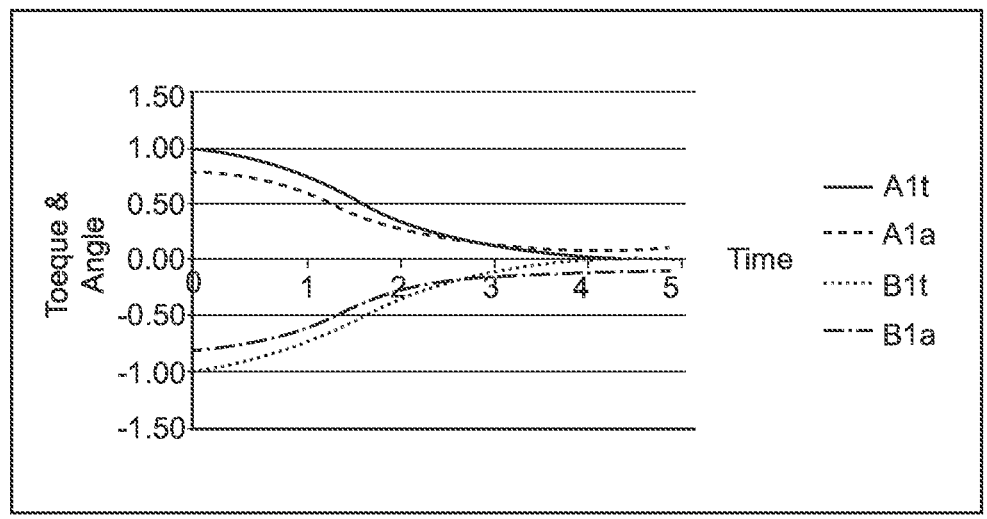
FIGS. 4-7 illustrate graphs of different driving scenarios, showing the relations between torque and angle of the steering gear of a first support motor and the steering gear of a second support motor.

FIG. 4 (Example A) illustrates minimizing rolling resistance (straight forward driving). The second steering gear angle B1a is adjusted to minimize the steering gear torque on both the left and right side, i.e. both the first torque A1t and second torque B1t. In this example, the driver adjusts the straight forward position at the same time. The difference between the first and the second steering gear angle (A1a−B1a) could be different on different suspension types and also due to tire rolling resistance or axle load, but the adjustment by the processing circuitry may suitably optimize independent of this (i.e. minimize the steering gear torques).

Figure 5:
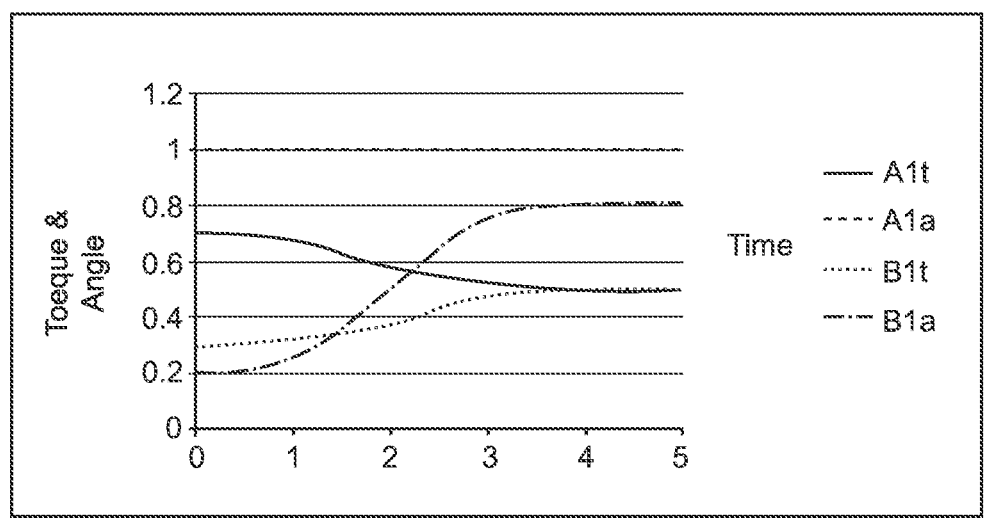

FIG. 5 (Example B) illustrates lateral force control (curve driving). The lateral force is adjusted to 50/50 by changing the second steering gear angle B1a to increase the torque B1t at the second steering gear to the same level as the torque A1t at the first steering gear. In this example, the first steering gear angle A1a has been fixed. The illustrated effect could also be used to change understeering or oversteering behaviour, due to the possibility to change lateral response between left and right side and also at the total average steering angle (A1a+B1a)/2.

Figure 6:
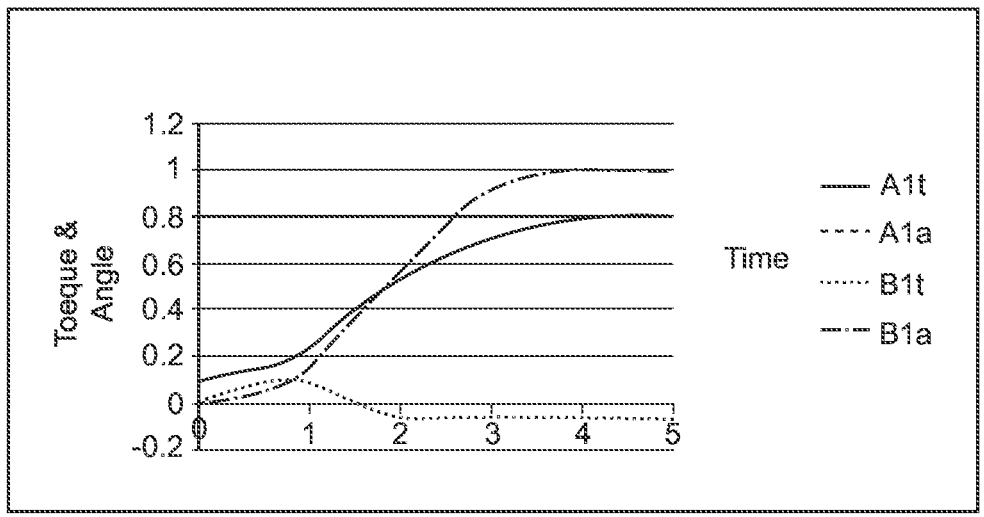

FIG. 6 (Example C) illustrates maximizing turnability (maximizing cut angle). The right side second steering gear angle B1a is adjusted to its maximum (following the (left side) first steering gear angle A1a). The needed torque in this example could change sign if a self-steering angle is reached and then only a smaller torque is needed to guide the second steering angle B1a to its maximum.

Figure 7:
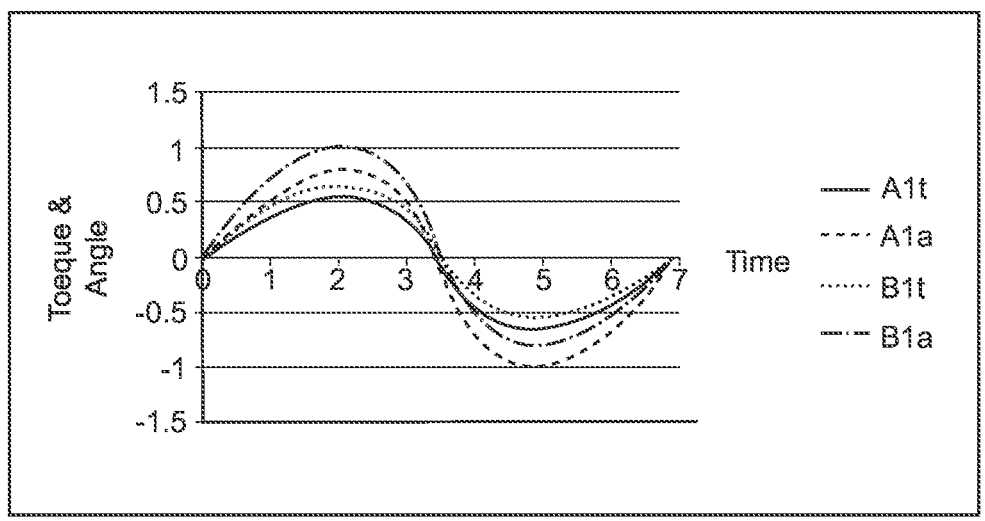

FIG. 7 (Example D) illustrates minimizing rolling resistance (small steering manoeuvres at high driving speed). At high-speed driving, it is desirable to keep a good relation between inner and outer wheel when the vehicle is slowly turning, such as in a lane change manoeuvre. The optimal angle is in the prior art compromised by setting a linkage geometry to a fixed setting, which is only optimal for a fixed wheel base and a chosen steering angle. However, with the vehicle steering system according to the general inventive concept disclosed herein, it is possible to adjust the angle between the first and the second road wheel 4B to the optimal angle independent of the vehicle wheel base or the steering angle. In at least some exemplary embodiments, the vehicle steering system may also comprise a self-learning system that generates the optimal signal for adjusting the second steering gear angle B1a in relation to the first steering gear angle A1a when driving faster than a certain speed.

Turning back to FIG. 2, the processing circuitry 50 may, suitably, be configured to receive from the second steering assembly 20B second input signals 34B, the second input signals 34B comprising one or more current steering parameter values measured for the second steering assembly 20B, wherein, the processing circuitry 50 is configured to control the second support motor 24B, by means of said control signals 52, also based on the received second input signals 24B.

Figure 3:
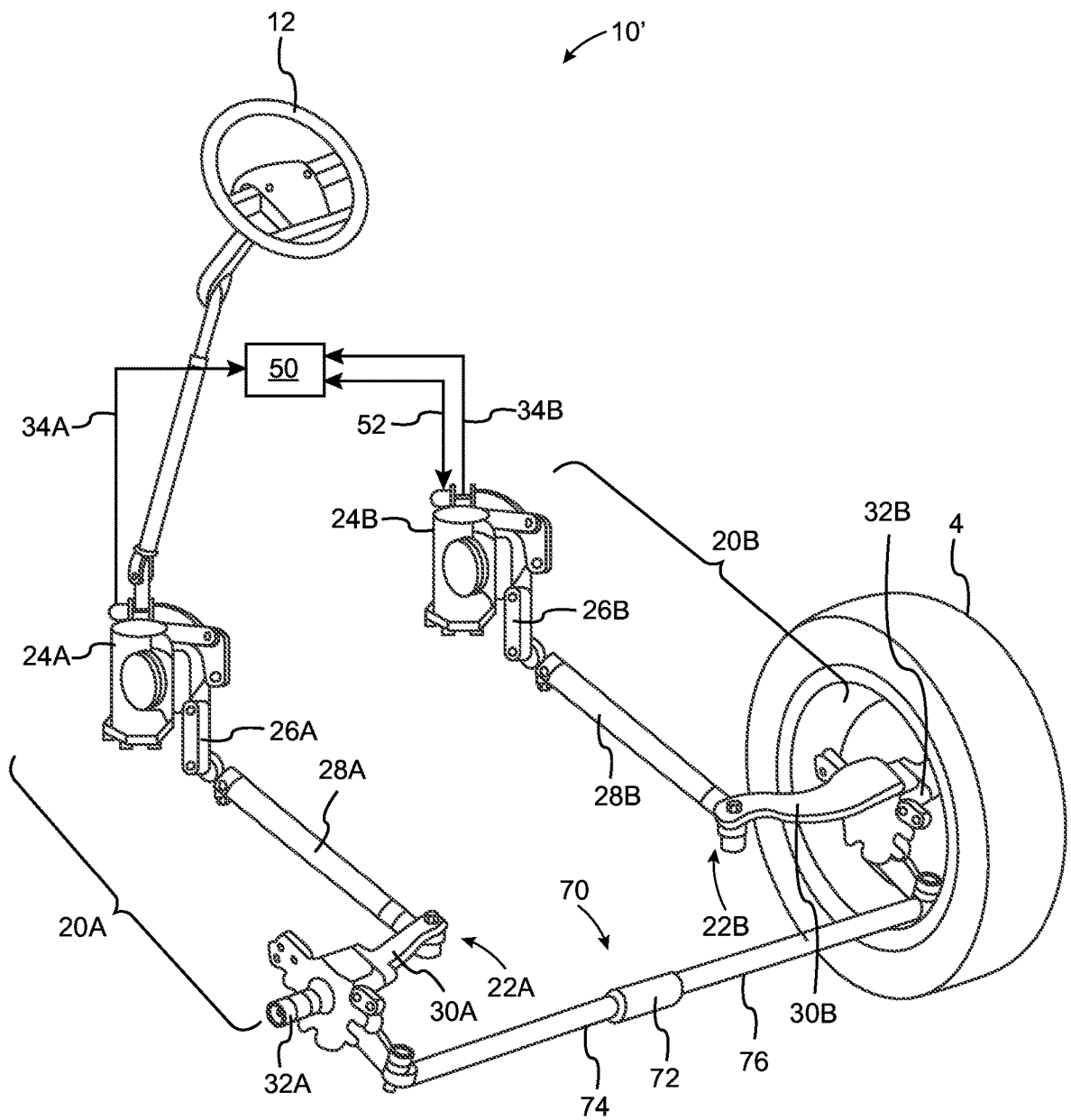
FIG. 3 illustrates a vehicle steering system according to at least another exemplary embodiment of the invention.

The vehicle steering system 10 may suitably comprise a connecting member assembly, for steering redundancy. Two different exemplary embodiments are illustrated in FIGS. 2 and 3. Starting with FIG. 2, the connecting member assembly 60 comprises a central joint 62, here in the form of a rotation joint. The connecting member assembly 60 further comprises a first connecting member 64 extending from the first steering assembly 20A to the one side of the central joint 62 and a second connecting member 66 extending from the second steering assembly 20B to another (here, to the opposite) side of the central joint 62. In particular, the first connecting member 64 is connected to the first support motor 24A and configured to rotate with the first support motor 24A (or its steering gear 25A). Similarly, the second connecting member 66 is connected to the second support motor 24B and configured to rotate with the second support motor 24B (or its steering gear 25B). The first connecting member 64 and the second connecting member 66 are movable relative to each other in the central joint 62. More specifically, since the central joint 62 is embodied as a rotation joint, it enables a relative rotational movement between the first connecting member 64 and the second connecting member 66 when the relative angle between the first steering angle and the second steering angle changes, i.e. when the relative angle between the two road wheels 4A, 4B changes. The connecting member assembly 60 provides added stability to the vehicle steering system 10, but because of the first and second connecting members 64, 66 being allowed to rotate relative to each other under normal operation, the angle of the second road wheel 4B may be freely adjusted without affecting the first road wheel 4A. In other words, the controlling of the second support motor 24B (by means of the processing circuitry 50) will not provide any substantial mechanical effect on the first support motor 24A. The first connecting member 64 will still rotate with the first support motor 24A while the second connecting member 66 will still rotate with the second support motor 24B.

The connecting member assembly 60 of FIG. 2 also comprises a safety feature for the unexpected event that the electric/hydraulic power steering at the second steering assembly 20B should fail/malfunction. The central joint 62 may include a safety rotational stop (not shown) which creates a mechanical safety connection between the first support motor 24A (steering gear 25A) and the second support motor 24B (steering gear 25B) if electrical/hydraulic support fails. In such case, the first connecting member 64 will, via the central joint 62, bring along the second connecting member 66 in its direction of rotation (possibly with some delay until the safety rotational stop is engaged). When the vehicle is turning, and consequently both road wheels 4A, 4B are turning, then, as explained above, the first link rod 28A and the second link rod 28B should move in different directions, and similarly the first Pitman arm 26A and the second Pitman arm 26B should pivot in different directions. To achieve this when the first connecting member 64 and the second connecting member 66 are mechanically connected in this safety mode, and thus rotating in the same direction, the vehicle steering system 10 in FIG. 2 additionally comprises a gear box 68, which changes the rotational direction. Thus, the gear box 68 changes the rotational direction such that the steering gear 25B of the second support motor 24B will rotate in an opposite direction to the steering gear 25A of the first support motor 24A, and consequently the Pitman arms 26A, 26B and the link rods 28A, 28B will also have opposite movements, thus resulting in both road wheels 4A, 4B turning in the same direction.

Turning now to FIG. 3, in this exemplary embodiment of the vehicle steering system 10', the central joint 72 of the connecting member assembly 70 is in the form of a translation joint. The translation joint enables relative translational movement between the first connecting member 74 and the second connecting member 76 when the relative angle between the first steering angle and the second steering angle changes. In other words, when the relative angle between the first road wheel 4A and the second road wheel 4B changes, the first connecting member 74 and/or the second connecting member 76 moves within the central joint 72. Thus, the effective length of the connecting member assembly 70 is variable and dependent on the relative angle between the first road wheel 4A and the second road wheel 4B. Similarly to the connecting member assembly 60 of FIG. 2, the connecting member assembly 70 of FIG. 3 provides steering redundancy and additional stability, while still allowing for the flexibility of the second steering angle being controlled by the processing circuitry 50 based on said input signals 34A, 34B. As illustrated in FIG. 3, the first connecting member 74 may suitably be connected to an arm at the first wheel knuckle 32A and the second connecting member 76 may suitably be connected to an arm at the second wheel knuckle 32B.

Figure 8:
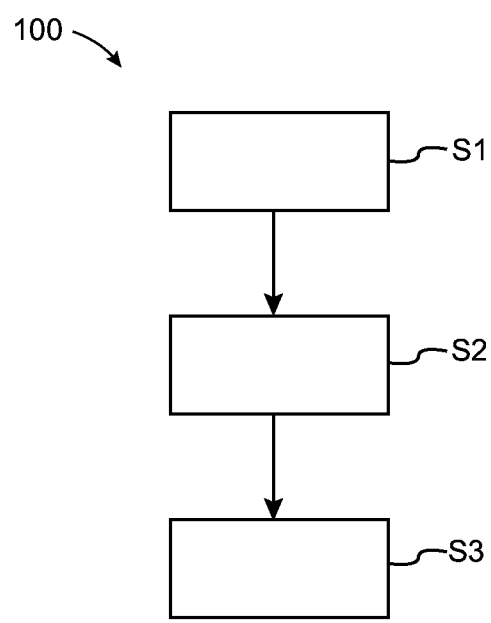
FIG. 8 illustrates a method according to at least one exemplary embodiment of the invention.

FIG. 8 illustrates a method 100 for controlling a steering angle of a vehicle wheel, the method 100 being implemented in a vehicle steering system which comprises:
  a first steering assembly, comprising
    a first steering linkage mechanically connected to a first road wheel at a first end of a wheel axle,
    a first support motor operatively connected to the steering wheel and the first steering linkage,
  wherein the steering wheel is configured to control a steering angle of the first road wheel via the first support motor actuating the first steering linkage,
  a second steering assembly, comprising
    a second steering linkage mechanically connected to a second road wheel at a second end of said wheel axle,
    a second support motor operatively connected to the second steering linkage.
The method 100 comprises:
  in a step S1, receiving from the first steering assembly first input signals, the first input signals comprising one or more steering parameter values measured for the first steering assembly,
  in a step S2, calculating, based on the received first input signals, a desired steering angle of the second road wheel, and
  in a step S3, sending control signals to the second support motor so as to actuate the second steering linkage such that said desired steering angle of the second road wheel is obtained.

The method 100 and any embodiment thereof may suitably be carried out for a vehicle steering system (such as illustrated in FIGS. 2 and 3) and/or a vehicle (such as illustrated in FIG. 1) as presented in this disclosure.

The invention claimed is:
1. A vehicle steering system, comprising:
  a steering wheel,
  a first steering assembly, comprising:
    a first steering linkage mechanically connected to a first road wheel at a first end of a wheel axle, and
    a first support motor operatively connected to the steering wheel and the first steering linkage, wherein the steering wheel is configured to control a steering angle of the first road wheel via the first support motor actuating the first steering linkage, a second steering assembly, comprising:
a second steering linkage mechanically connected to a second road wheel at a second end of the wheel axle, and
a second support motor operatively connected to the second steering linkage,
wherein each of the first road wheel and the second road wheel is mechanically independent of the other such that an adjustment of a steering angle of the second road wheel does not affect the steering angle of the first road wheel, a connecting member assembly, comprising:
a central joint,
a first connecting member extending from the first steering assembly to one side of the central joint, and
a second connecting member extending from the second steering assembly to another side of the central joint,
wherein:
the first connecting member and the second connecting member are movable relative to each other in the central joint, and
the central joint is a rotation joint for enabling relative rotational movement in the central joint between the first connecting member and the second connecting member when a relative angle between a first steering angle and a second steering angle changes, and a processing circuitry configured to adjust a relative steering angle between the first road wheel and the second road wheel by being configured to:
receive, from the first steering assembly, first input signals, the first input signals comprising one or more steering parameter values measured for the first steering assembly,
based on the received first input signals and a vehicle speed, calculate a desired steering angle of the second road wheel, and
send control signals to the second support motor so as to actuate the second steering linkage such that the desired steering angle of the second road wheel is obtained.

2. The vehicle steering system of claim 1, wherein the processing circuitry is configured to also base its calculations of the desired steering angle on a current or a desired vehicle operating condition other than the vehicle speed.

3. The vehicle steering system of claim 1, wherein the processing circuitry comprises or has communicative access to an electronic memory in which a set of rules is stored, wherein each rule is associated with one or more predefined vehicle operating conditions,
wherein, for a certain current or desired vehicle operating condition, the processing circuitry is configured to also base its calculations of the desired steering angle on a rule associated with the certain current or desired vehicle operating condition.

4. The vehicle steering system of claim 1, wherein the processing circuitry is configured to:
receive from the second steering assembly second input signals, the second input signals comprising one or more current steering parameter values measured for the second steering assembly, and
control the second support motor, by the control signals, also based on the received second input signals.

5. The vehicle steering system of claim 4, wherein the one or more current steering parameter values measured for the second steering assembly are at least one of:
a steering gear angle of a gear of the second support motor directly or indirectly engaged with the second steering linkage,
a steering torque provided by the second support motor to the second steering linkage, and
a force measured in the second steering linkage.

6. The vehicle steering system of claim 1, wherein the one or more steering parameter values measured for the first steering assembly are at least one of:
a steering gear angle of a gear of the first support motor directly or indirectly engaged with the first steering linkage,
a steering torque provided by the first support motor to the first steering linkage, and
a force measured in the first steering linkage.

7. The vehicle steering system of claim 1, wherein the first support motor is an electric or hydraulic support motor, and wherein the second support motor is an electric or hydraulic support motor.

8. The vehicle steering system of claim 1, wherein the processing circuitry is configured to calculate the desired steering angle so as to allow adaptation for at least one of:
shunting,
cornering,
bump and brake steer compensation,
toe in or toe out compensation, and
Ackerman angle control.

9. A vehicle comprising:
a vehicle steering system, comprising:
a steering wheel,
a first steering assembly, comprising:
a first steering linkage mechanically connected to a first road wheel at a first end of a wheel axle, and
a first support motor operatively connected to the steering wheel and the first steering linkage,
wherein the steering wheel is configured to control a steering angle of the first road wheel via the first support motor actuating the first steering linkage,
a second steering assembly, comprising:
a second steering linkage mechanically connected to a second road wheel at a second end of the wheel axle, and
a second support motor operatively connected to the second steering linkage,
wherein each of the first road wheel and the second road wheel is mechanically independent of the other such that an adjustment of a steering angle of the second road wheel does not affect the steering angle of the first road wheel,
a connecting member assembly, comprising:
a central joint,
a first connecting member extending from the first steering assembly to one side of the central joint, and
a second connecting member extending from the second steering assembly to another side of the central joint,
wherein:
the first connecting member and the second connecting member are movable relative to each other in the central joint, and
the central joint is a rotation joint for enabling relative rotational movement in the central joint between the first connecting member and the second connecting member when a relative angle between a first steering angle and a second steering angle changes, and a processing circuitry configured to adjust a relative steering angle between the first road wheel and the second road wheel by being configured to:

receive, from the first steering assembly, first input signals, the first input signals comprising one or more steering parameter values measured for the first steering assembly, based on the received first input signals and a vehicle speed, calculate a desired steering angle of the second road wheel, and send control signals to the second support motor so as to actuate the second steering linkage such that the desired steering angle of the second road wheel is obtained.

10. A method for controlling a steering angle of a vehicle wheel, the method being implemented in a vehicle steering system which comprises:

a first steering assembly, comprising:
a first steering linkage mechanically connected to a first road wheel at a first end of a wheel axle, and
a first support motor operatively connected to a steering wheel and the first steering linkage,
wherein the steering wheel is configured to control a steering angle of the first road wheel via the first support motor actuating the first steering linkage, a second steering assembly, comprising:
a second steering linkage mechanically connected to a second road wheel at a second end of the wheel axle, and
a second support motor operatively connected to the second steering linkage,
wherein each of the first road wheel and the second road wheel is mechanically independent of the other such that an adjustment of a steering angle of the second road wheel does not affect the steering angle of the first road wheel, and a connecting member assembly, comprising:
a central joint,
a first connecting member extending from the first steering assembly to one side of the central joint, and
a second connecting member extending from the second steering assembly to another side of the central joint,
wherein:
the first connecting member and the second connecting member are movable relative to each other in the central joint, and
the central joint is a rotation joint for enabling relative rotational movement in the central joint between the first connecting member and the second connecting member when a relative angle between a first steering angle and a second steering angle changes, the method comprising adjusting a relative steering angle between the first road wheel and the second road wheel by:

receiving from the first steering assembly first input signals, the first input signals comprising one or more steering parameter values measured for the first steering assembly, calculating, based on the received first input signals and a vehicle speed, a desired steering angle of the second road wheel, and sending control signals to the second support motor so as to actuate the second steering linkage such that the desired steering angle of the second road wheel is obtained.

* * * * *